R. HENLEY.
BRAKE.
APPLICATION FILED OCT. 28, 1911.
1,027,332.
Patented May 21, 1912.
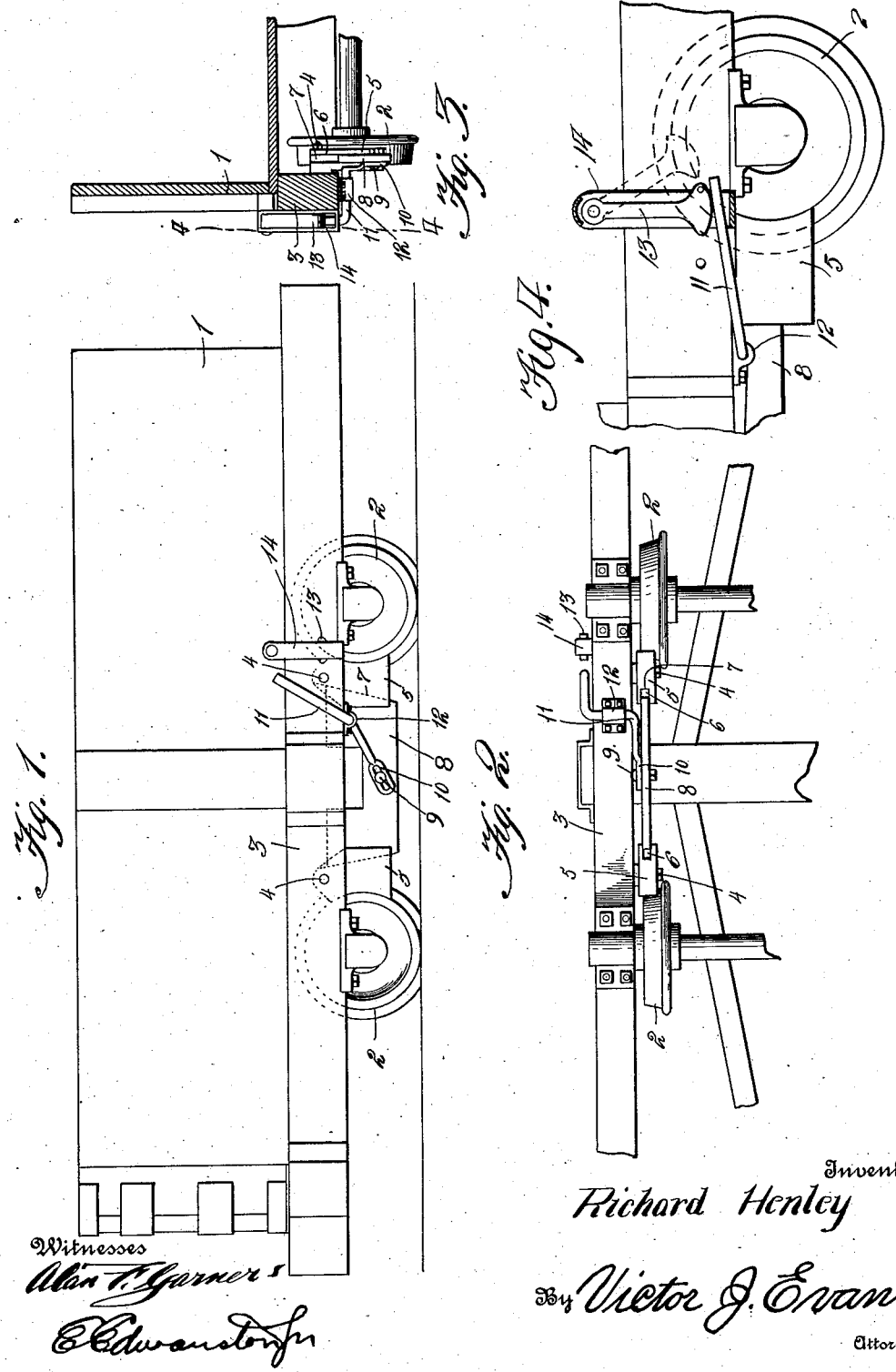
Witnesses
Inventor
Richard Henley
By Victor J. Evans
Attorney

UNITED STATES PATENT OFFICE.

RICHARD HENLEY, OF WILKES-BARRE, PENNSYLVANIA.

BRAKE.

1,027,332. Specification of Letters Patent. Patented May 21, 1912.

Application filed October 28, 1911. Serial No. 657,225.

*To all whom it may concern:*

Be it known that I, RICHARD HENLEY, a citizen of the United States, residing at Wilkes-Barre, in the county of Luzerne and State of Pennsylvania, have invented new and useful Improvements in Brakes, of which the following is a specification.

This invention relates to brakes and more particularly to that type which are used upon mine cars, although the same may be readily adapted to other types of cars without departing from the spirit or scope of the invention.

One of the principal objects of the invention is to provide a simple and efficient device of this character which will be durable, readily operable, and conveniently locked in inoperative position.

Further objects of this invention will appear as the following specific description is read in connection with the accompanying drawing, which forms a part of this application, and in which:—

Figure 1 is a side elevation. Fig. 2 is a bottom plan view. Fig. 3 is an end view showing the car in section. Fig. 4 is a detail sectional view on the line 4—4 of Fig. 3.

Referring more particularly to the drawing, 1 represents an ordinary mine car which is mounted upon the wheels 2. Secured to the side bars 3 of the car in any approved manner, as by the pivotal bolts 4, are the brake shoes 5. These shoes are vertically grooved upon their rear faces, as shown at 6, the rear wall 7 thereof being slightly inclined, as shown. Mounted to slide in the grooves is an operating weight 8 having its end walls adapted to correspond with the walls 7 and being provided with a laterally extending stud or bolt 9 which is engaged with the slotted end 10 of an operating lever 11. This lever is pivoted in a bracket 12 carried upon the under side of the side bars 3 and has its free end adapted to be engaged beneath a pawl 13 which is in the form of a pendulum and normally hangs in a vertical position. This pawl operates in a housing 14 which acts to guide the free end of the lever and is thrown out of the way thereby when the lever is depressed to raise the weight. By simply releasing the pawl from the end of the lever, the operating weight will drop and being of wedge formation, will force the shoes apart into engagement with the walls.

What is claimed is:

1. In a device of the class described, the combination with a truck having a pair of wheels, of brake shoes pivoted to the truck and adapted to engage the wheels, a wedge-shaped weight operating between the shoes, means for raising said weight, and means for holding the weight in raised position.

2. In a device of the class described, the combination with a truck having a pair of wheels, of brake shoes pivoted to the truck and adapted to engage said wheels, said brake shoes having grooves with an inclined wall, a wedge-shaped weight operating in the grooves and against the inclined wall, means to raise said weight, and means to lock the weight in raised position.

3. In a device of the class described, the combination with a truck having a pair of wheels, of brake shoes pivoted to the truck, and adapted to engage the wheels, said shoes having grooves with an inclined wall, of a wedge-shaped weight operating in the grooves and against the inclined wall, a lever pivoted to the truck and to the weight, for raising the same, a housing adapted to guide the free end of the lever, and a pendulum pawl pivoted in the housing and adapted to engage over the free end of the lever to lock the same when the weight is raised.

In testimony whereof I affix my signature in presence of two witnesses.

RICHARD HENLEY.

Witnesses:
THOMAS D. EVANS,
WILLIAM C. SEVERSON.